United States Patent
Besarati et al.

(10) Patent No.: US 11,654,393 B2
(45) Date of Patent: May 23, 2023

(54) TEMPERATURE VACUUM SWING ADSORPTION PROCESS SUITED FOR CARBON CAPTURE TO REGENERATE SORBENTS USING THE CO2 PRODUCT GAS AS THE HEAT TRANSFER MEDIUM

(71) Applicant: CARBON CAPTURE, INC., Los Angeles, CA (US)

(72) Inventors: Saeb Besarati, Los Angeles, CA (US); William T. Gross, Pasadena, CA (US); Brian J. Holman, Los Angeles, CA (US); Eric W. Colbert, Los Angeles, CA (US); Dan Fang, Los Angeles, CA (US)

(73) Assignee: CARBON CAPTURE INC., Los Angeles, CA (US)

( * ) Notice: Subject to any disclaimer, the term of this patent is extended or adjusted under 35 U.S.C. 154(b) by 0 days.

(21) Appl. No.: 17/823,024

(22) Filed: Aug. 29, 2022

(65) Prior Publication Data

US 2023/0070112 A1    Mar. 9, 2023

Related U.S. Application Data

(60) Provisional application No. 63/238,190, filed on Aug. 29, 2021.

(51) Int. Cl.
*B01D 53/047* (2006.01)
*B01D 53/04* (2006.01)
(Continued)

(52) U.S. Cl.
CPC ..... *B01D 53/0476* (2013.01); *B01D 53/0462* (2013.01); *B01D 53/06* (2013.01);
(Continued)

(58) Field of Classification Search
CPC .. B01D 53/04; B01D 53/047; B01D 53/0476; B01D 53/0462; B01D 53/06;
(Continued)

(56) References Cited

U.S. PATENT DOCUMENTS

| 4,784,672 A  * | 11/1988 | Sircar  | B01D 53/0462 95/143 |
| 2008/0202339 A1* | 8/2008 | Nalette | B01D 53/0476 95/120 |

(Continued)

FOREIGN PATENT DOCUMENTS

WO    2019/161114 A1    8/2019

OTHER PUBLICATIONS

International Search Report and Written Opinion of PCT International Application PCT/US22/75600, dated Nov. 3, 2022.

*Primary Examiner* — Frank M Lawrence, Jr.
(74) *Attorney, Agent, or Firm* — Raphael Bellum PLLC

(57) ABSTRACT

Solid sorbents, and especially zeolites, are attractive candidates for $CO_2$ direct air capture (DAC) and point source capture applications because of their potential for high selectivity, fast kinetics, and low energy $CO_2$ capture cycles. A common issue with solid sorbents, including zeolites, is their low thermal conductivity, which makes them difficult to heat for regeneration without using complex and expensive heat transfer systems. This invention utilizes a modified TVSA process which utilizes the product $CO_2$ gas itself as the heating medium for the adsorbent bed, alone or in conjunction with internal or external heaters. The use of $CO_2$ as a heating medium allows efficient heating of the sorbent bed and enables high purity $CO_2$ product.

20 Claims, 5 Drawing Sheets

(51) Int. Cl.
- *F24F 3/14* (2006.01)
- *B01D 53/14* (2006.01)
- *B01D 71/02* (2006.01)
- *B01D 53/06* (2006.01)

(52) U.S. Cl.
CPC ..... *B01D 53/1425* (2013.01); *B01D 71/0281* (2022.08); *F24F 3/1411* (2013.01); *B01D 2253/108* (2013.01); *B01D 2257/504* (2013.01); *B01D 2258/06* (2013.01); *B01D 2259/40007* (2013.01); *F24F 2003/144* (2013.01)

(58) Field of Classification Search
CPC .......... B01D 53/1425; B01D 2253/108; B01D 2257/504; B01D 2258/06; B01D 2259/40007; B01D 71/0281; F24F 3/1411; F24F 2003/144
USPC ... 95/96, 101, 102, 113, 117, 121–123, 130; 96/121, 125–128, 132; 423/230

See application file for complete search history.

(56) References Cited

U.S. PATENT DOCUMENTS

| | | | |
|---|---|---|---|
| 2012/0160099 A1* | 6/2012 | Shoji | B01D 53/1475 96/144 |
| 2014/0096684 A1* | 4/2014 | Ogino | B01D 53/025 96/242 |
| 2016/0166978 A1* | 6/2016 | Tai | B01D 63/046 95/26 |
| 2017/0203249 A1* | 7/2017 | Gebald | B01D 53/62 |
| 2019/0352239 A1 | 1/2019 | Nieskens | |
| 2019/0143258 A1 | 5/2019 | Meirav | |
| 2020/0001225 A1 | 1/2020 | Ritter | |
| 2020/0009494 A1 | 1/2020 | Ritter | |
| 2021/0146299 A1* | 5/2021 | Besarati | C25B 15/081 |

\* cited by examiner

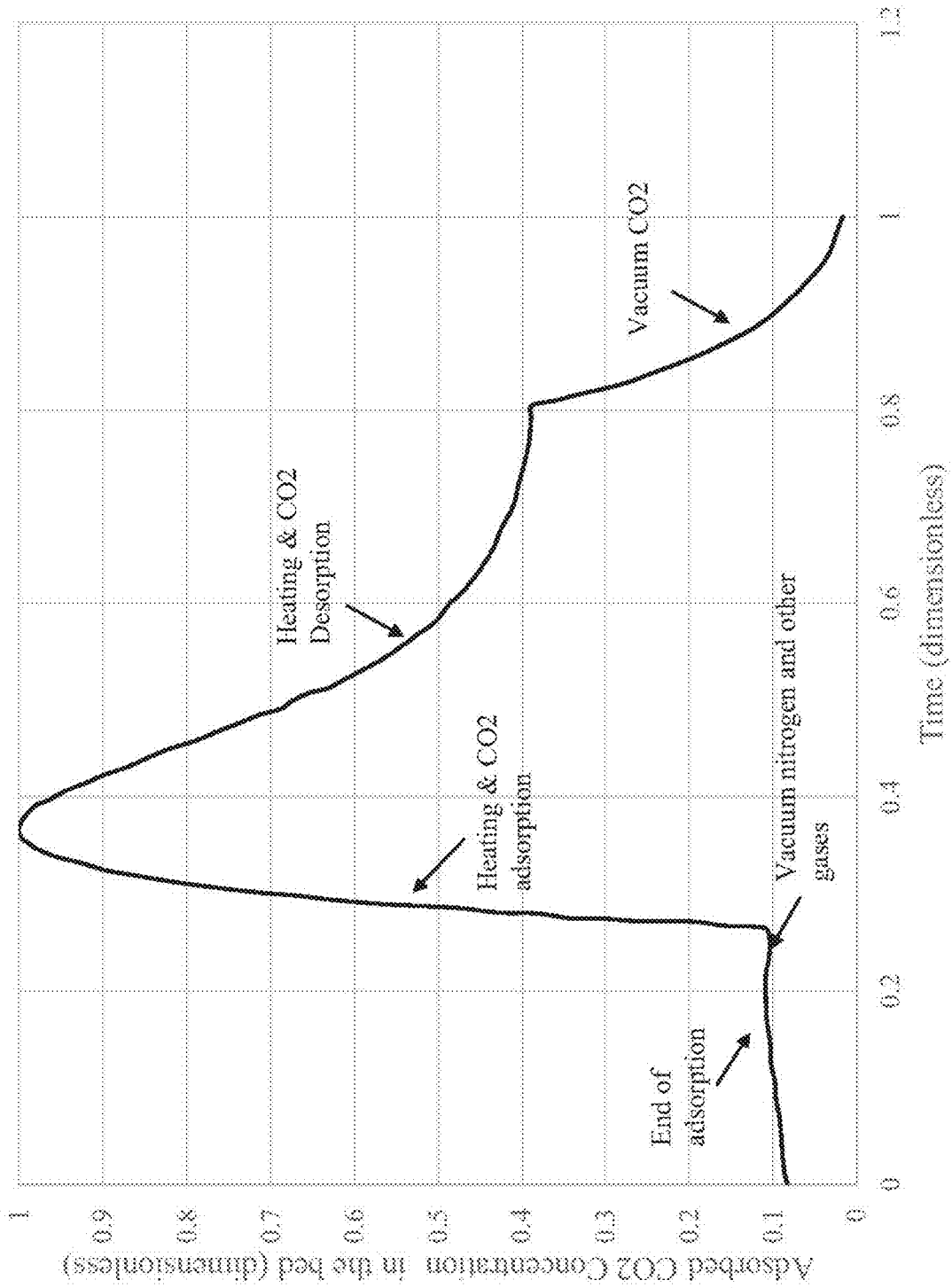

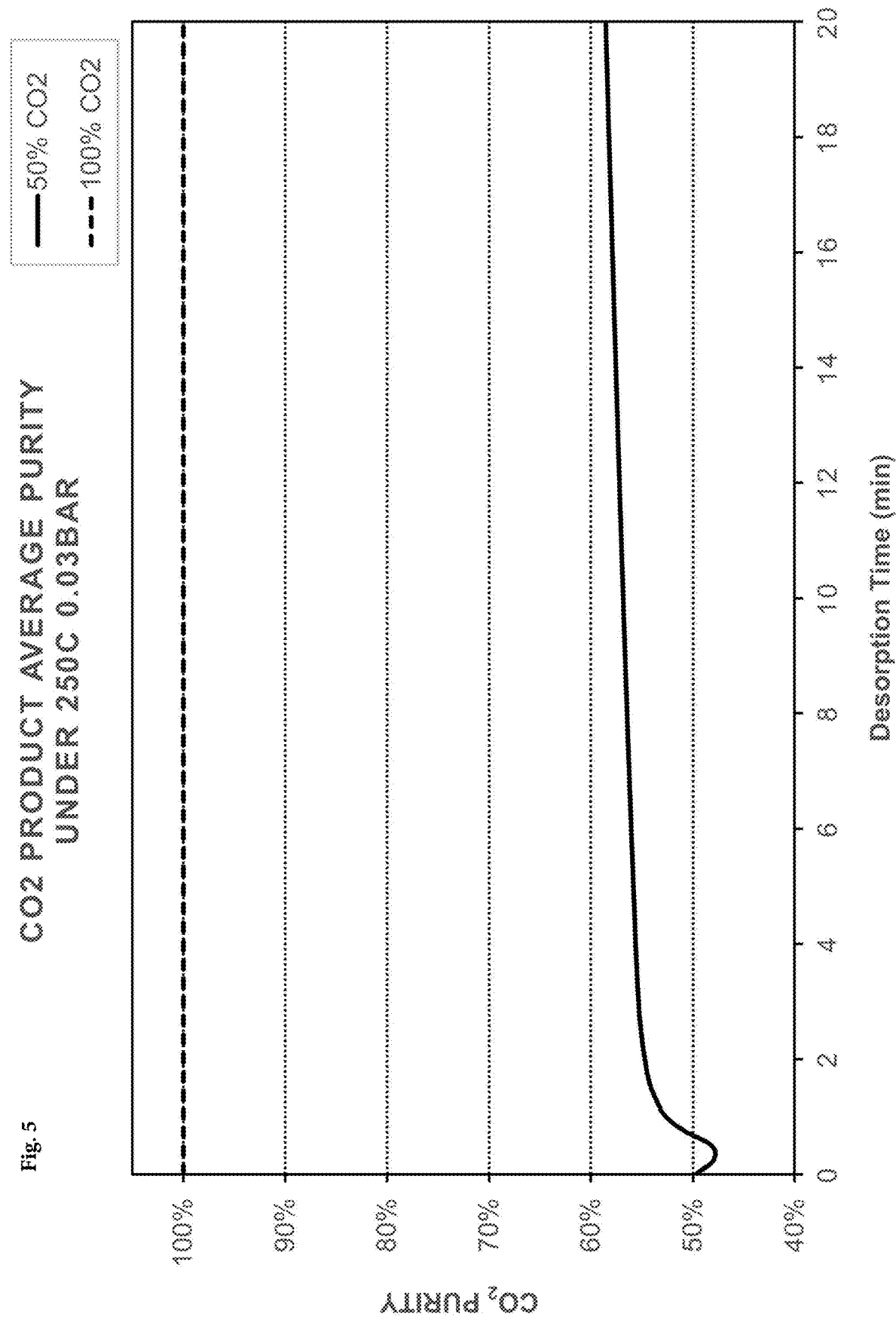

TEMPERATURE VACUUM SWING ADSORPTION PROCESS SUITED FOR CARBON CAPTURE TO REGENERATE SORBENTS USING THE CO2 PRODUCT GAS AS THE HEAT TRANSFER MEDIUM

TECHNICAL FIELD

The invention relates to efficient methods for gas separation processes such as direct air capture of $CO_2$. The invention provides methods for efficient heating of adsorbent beds and enables production of high-purity product gas streams.

BACKGROUND

Global warming is posing devastating effects on our climate, health, and communities. Coastal flooding due to rising sea levels, extended wildfire seasons, as well as more destructive hurricanes are the direct impacts of climate change. Moreover, global food and water security are at stake. There is a consensus among scientists that global warming is directly linked to the increase in the level of greenhouse gases in the atmosphere. Carbon dioxide ($CO_2$) is a major greenhouse gas and its concentration in the atmosphere has sharply increased over the past century due to the burning of fossil fuels. Although efforts are underway to move toward renewable energy sources that do not emit greenhouse gases, shifting our energy supply to completely renewable sources is not possible in the near term and requires further technological advancements and significant global investments. Therefore, there is a growing need for technologies that can efficiently capture carbon dioxide from the flue gas of power plants and other industrial processes and, increasingly, even from ambient air. The latter is known as direct air capture (DAC).

A common approach to DAC basically involves a first step of moving ambient air through a bed of a solid sorbent that is effective at selectively capturing a significant portion or all of the $CO_2$ contained therein. Once the sorbent reaches a level of significant saturation of $CO_2$, it needs to be regenerated in a second step. During regeneration, the sorbent bed is treated with, for example, heat, vacuum, steam, or some combination thereof to cause the $CO_2$ to desorb from the sorbent. The released $CO_2$ is subsequently captured, and the regenerated sorbent can then be returned to the first step and reused to capture more $CO_2$. Due to the low concentrations (currently a little over 400 parts per million) of $CO_2$ in ambient air, high volumes of ambient air need to be moved and processed in a DAC process. Moreover, additional energy is required to regenerate the sorbent, so the system needs to be highly efficient.

Common solid $CO_2$ sorbents include various zeolites or molecular sieves; amine-functionalized silicious, inorganic, activated carbon, graphitic, metal organic framework (MOF) or polymeric supports; amine-functionalized carbon, glass, cellulosic, or polymeric fibers; and basic or weakly basic ion exchange resins. In some cases, the solid $CO_2$ sorbents are utilized in powder or pellet form in fluidized bed or packed bed configurations. In the case of packed beds, ambient air flows through a column of the packed sorbent and experiences a significant pressure drop across the column, requiring additional energy to compensate. In other cases, the solid $CO_2$ sorbents are utilized in fibrous webs, mats, or woven fabrics through which air is passed. In still other cases, the solid $CO_2$ sorbents are formed into structured monoliths or other structured forms such as sheets, films, membranes, or plates arranged within a structured bed through or around which air may be passed.

Temperature vacuum swing adsorption (TVSA) is a promising process for direct air capture (DAC) and flue gas where a high working capacity and purity are required. Under a typical TVSA process, a vacuum is first applied to the reactor to remove weakly adsorbed gases such as nitrogen as well as the gases in the dead spaces. Then, the temperature is increased to a point where the species of interest, i.e., carbon dioxide, starts to desorb. The process is completed by re-pressurizing the reactor and cooling the bed to the adsorption condition. In contrast with pressure swing adsorption (PSA) where the cycle time is very short, TVSA is associated with a longer cycle time due to the time required to heat the bed to the desired temperature.

Efficiently providing the necessary heat required for TVSA can present challenging design problems for solid sorbents packed or structured bed configurations. For example, the thermal conductivity of most solid sorbents is very low (e.g., zeolites have thermal conductivities around 0.1 W/m·K), which requires heating elements to be very closely embedded and evenly distributed within the bed to reduce heating time. Structured beds comprising arrangements of sheets, films, webs, plates, etc. have considerable amounts of insulating dead space between the structured sorbents. The presence of closely packed heat exchangers and large amounts of internal dead space increases the overall cost and presents design challenges. Direct steam has been successfully used for providing heat for regenerating amine-based sorbents for $CO_2$ capture, but it has been largely avoided for other well-developed, commercially available sorbents such as zeolites due to issues with capacity reduction and stability. Alternatively, the bed can be more effectively heated using a flowing gas, but the choice of the heating medium remains as a challenge, as it results in diluting the product stream.

SUMMARY OF THE INVENTION

Solid sorbents, and especially zeolites, are attractive candidates for $CO_2$ direct air capture (DAC) and point source capture applications because of their potential for high selectivity, fast kinetics, and low energy $CO_2$ capture cycles. A common issue with solid sorbents, including zeolites, is their low thermal conductivity, which makes them difficult to heat for regeneration without using complex and expensive heat transfer systems. This invention utilizes a modified TVSA process which utilizes the product $CO_2$ gas itself as the heating medium for the adsorbent bed, alone or in conjunction with internal or external heaters. The use of $CO_2$ as a heating medium allows efficient heating of the sorbent bed and enables high purity $CO_2$ product.

BRIEF DESCRIPTION OF THE DRAWINGS

These and other objects, features and attendant advantages of the present invention will be more fully appreciated or become better understood when considered in conjunction with the accompanying drawings, wherein:

FIG. 4 is a graph showing variations of adsorbed $CO_2$ concentration in the bed during the proposed TVSA process; and FIG. 5 is a graph showing the average $CO_2$ product purity over the course of desorption when using pure $CO_2$ or 50% $CO_2$ in nitrogen as the heating gas.

DETAILED DESCRIPTION OF THE INVENTION

Figure 1:
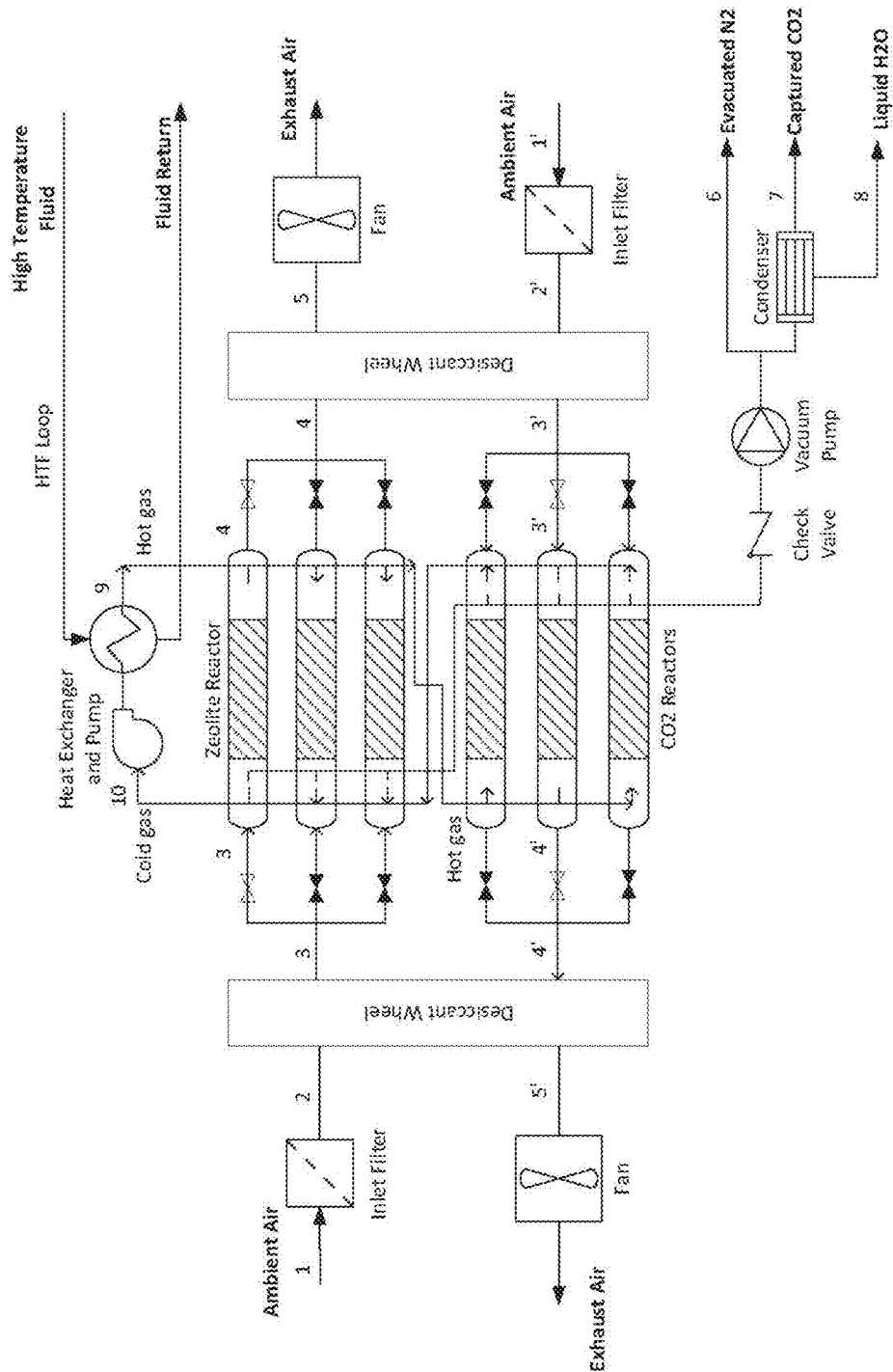
FIG. 1 is a functional block diagram of a direct air capture (DAC) plant showing the process flow.
Figure 2:
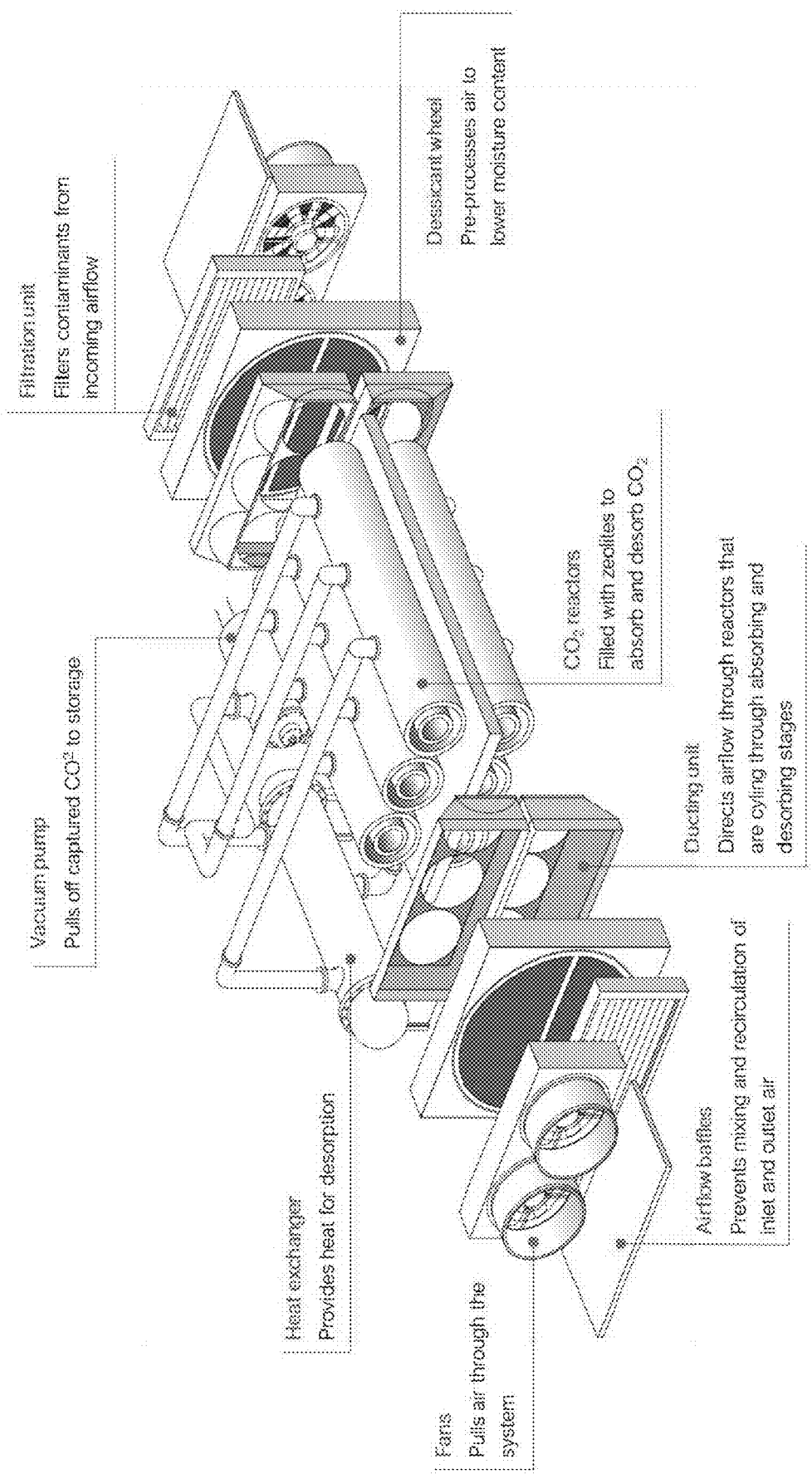
FIG. 2 is a diagrammatic illustration of the DAC plant.

FIGS. 1 and 2 show the process flow diagram for the direct air capture (DAC) plant that is under development by Carbon Capture, Inc. The carbon capture process consists of two general steps, adsorption and desorption, as described below.

Adsorption: Ambient air is drawn into the plant and optionally cleaned from particulates by passing through a filter, as represented by first air flow moving from state 1 to state 2 and a second air flow moving from state 1' to state 2'. Then, humid air enters a desiccant reactor, which in some embodiments is in the form of a rotating desiccant wheel, where a large fraction of the humidity is removed, as represented by the first air flow moving from state 2 to state 3 and second air flow moving from state 2' to state 3'. Next, relatively dry air enters a zeolite reactor (which may also be referred to herein as a $CO_2$ reactor and comprises a packed, fluidized, or structured bed of solid $CO_2$ adsorbent) where the remaining humidity and $CO_2$ are adsorbed. Air that exits the zeolite reactor is completely dry and slightly heated, as represented by the first air flow in state 4 and second air flow in state 4', which is a favorable condition to regenerate another desiccant reactor. Therefore, the stream at state 4 and state 4' are passed through another desiccant reactor, where water is removed from the bed and re-adsorbed by air, as represented in state 5 and state 5'. According to one exemplary embodiment of the invention, the dry and slightly heated air exiting the zeolite reactor can be used to regenerate a desiccant bed as disclosed in the Assignee's co-pending U.S. patent application Ser. No. 17/823,016, entitled "Continuous Processes and Systems to Reduce Energy Requirements of Using Zeolites for Carbon Capture under Humid Conditions," the entire contents of which are hereby incorporated by reference. The use of the dry and slightly heated air exiting the zeolite reactor leads to extensive savings in energy costs.

Also, using a desiccant wheel instead of a packed bed, as shown in the plant in FIG. 1, enables the continuous operation of the dehydration units. The timing of the two desiccant wheels operation can be adjusted in a way that air at state 2 or 2' always enters a portion of the wheel that is regenerated and ready for water adsorption. On the other hand, the dry and slightly heated air at states 4 and 4' always passes through a section of the wheel that is filled with water and requires regeneration. Therefore, using continuously rotating wheels with lags between their operation provides the opportunity to make the dehydration process continuous, which results in savings in capital cost.

Desorption: While two zeolite reactors shown in FIG. 1 are going through adsorption, the remaining four reactors are being regenerated. The regeneration is done through a combination of vacuum and heat. First, vacuum is applied to the reactors, which leads to removal of air in the dead space as well as nitrogen from the zeolite (state 6). Next, the bed is heated to a temperature that $CO_2$ and water are desorbed. Water can then be removed from the desorbed stream by passing through a condenser (state 8), leaving the captured $CO_2$ to pass through for collection (state 7).

During desorption, the bed can be heated using internal heat exchangers in the reactors. However, the low thermal conductivity of zeolite requires the heat exchanger pipes to be very close to each other, which leads to high heat exchanger surface area and capital cost. Alternatively, or in addition to internal heating, the zeolite bed can be heated by recirculating a hot gas through the bed. For a zeolite adsorbent bed, which will strongly interact with water, the hot gas should preferably be a dry gas, nonlimiting examples of which include dry air or dry nitrogen, or mixtures thereof. Below is a summary of the modified desorption steps when hot-gas heating is utilized:

A) Vacuum: Vacuum is applied to the bed to remove nitrogen from zeolite as well as the air in the dead space, as shown in state 6.

B) Heat: The reactor is pressurized and heated with flowing hot gas, as shown in state 9, optionally in conjunction with additional heating from internal heat exchangers.

C) Vacuum: Vacuum is applied again after the bed reaches the desired temperature.

This results in removing all of the gases from the bed including the amounts adsorbed during adsorption and heating.

D) Condensation: The water from the desorbed stream is condensed out to increase the purity of captured $CO_2$ as shown in states 7 and 8.

The choice of the heating gas affects the purity of the desorbed $CO_2$ stream. For some applications of the captured $CO_2$, such as sequestration, mineralization or concrete production, the required $CO_2$ purity is fairly relaxed. For use in enhanced oil recovery (EOR) or as a feedstock for chemical and fuel production, however, higher purity (sometimes higher than 90% or even 95%) is required. The present invention utilizes a modified TVSA process which enables utilizing the product $CO_2$ itself as an efficient heating medium and results in a recovered $CO_2$ product of high purity. If high product purity is not particularly important, other gases such as dry or dry nitrogen may be combined with the $CO_2$ in any desired combination to form the heating medium.

Figure 3:
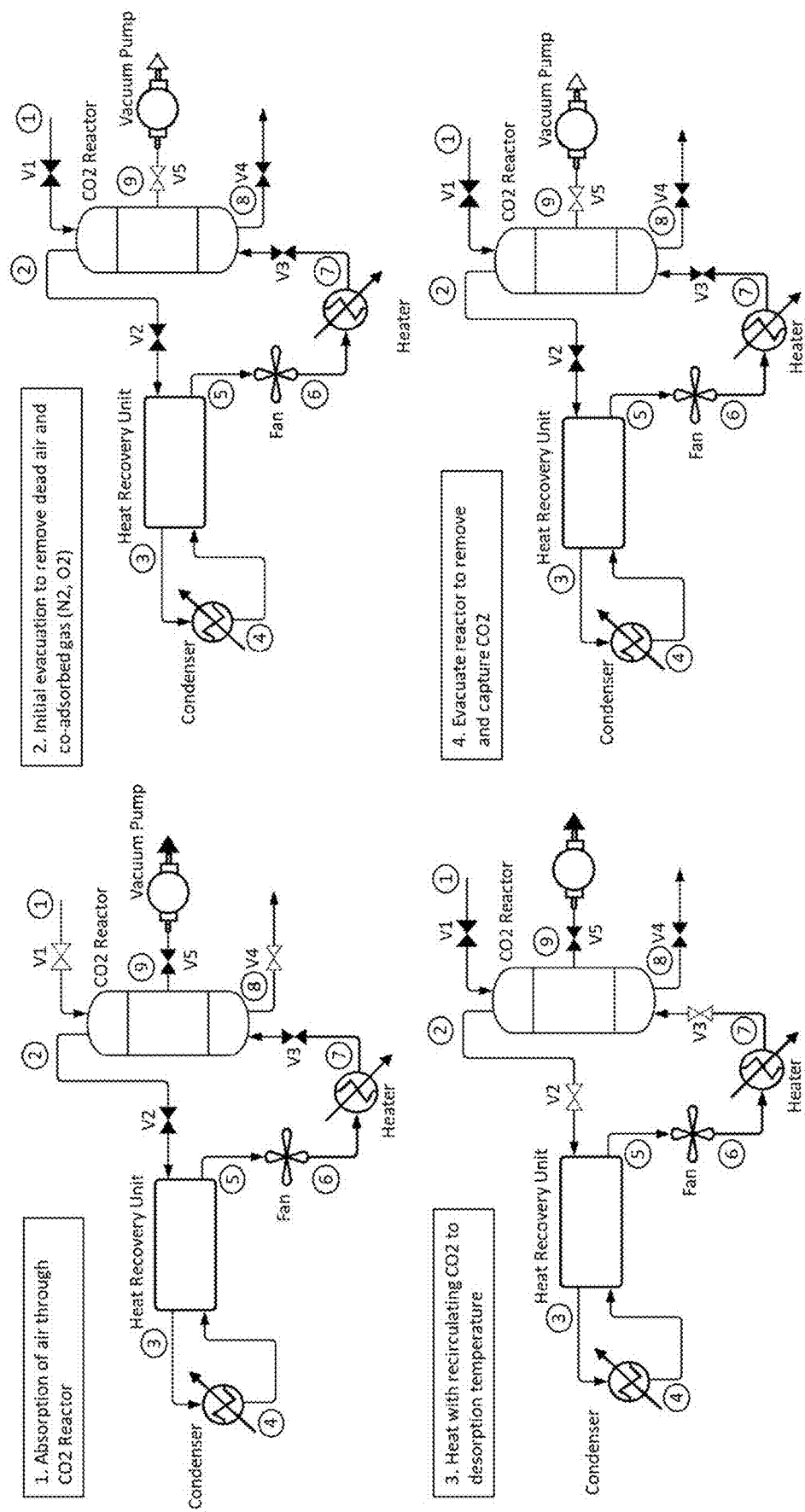
FIG. 3 is a diagram of the steps in the modified temperature vacuum swing adsorption (TVSA) process utilizing $CO_2$ as the heating gas.

FIG. 3 presents the details of the modified TVSA process of the present invention utilizing $CO_2$ as the heating gas. In some embodiments of the present invention, pure $CO_2$ will be used as the heating gas. In some embodiments of the present invention, the $CO_2$ may be mixed in any desired combination with other dry gases and used as the heating. Nonlimiting examples of such other gases include dry air and dry nitrogen. In some embodiments of the present invention, the $CO_2$ and/or other dry gases will have water contents less than about 100 ppm. In some embodiments of the present invention, the $CO_2$ and/or other dry gases will have water contents less than about 500 ppm. In some embodiments of the present invention, the $CO_2$ and/or other dry gases will have water contents less than about 1,000 ppm. In some embodiments of the present invention, the $CO_2$ will be derived from the product stream of the DAC process. The system shown in FIG. 3 is specifically drawn for DAC application using zeolite as the adsorbent. However, the process is extendable to point source application as well. For applications at large scale, the equipment including vacuum pump, heat exchanger, and condenser can be shared between multiple reactors to reduce the capital cost. There are four main steps that can be defined as:

1) Adsorption: Air enters the $CO_2$ reactor at point 1 and passes through the zeolite bed. The bed can be in the form of a packed, fluidized, or structured bed such as monolith. The main species in the gas that are adsorbed during this step are CO$_2$, nitrogen, and water. It is typically recommended to dehydrate air before entering the zeolite bed due to high energy requirements for water desorption, but a condenser is used during the desorption process to remove any moisture present in the gas. The purified air exits the system at point 8.

2) Vacuum I: During this process the CO$_2$ reactor is put under vacuum to remove the air in the dead space as well as the weakly adsorbed gases from the zeolite, e.g., nitrogen at point 9. In some embodiments of the present invention, the pressure is reduced to 0.05 bar or less. In some embodiments of the present invention, the pressure is reduced to 0.1 bar or less. In some embodiments of the present invention, the pressure is reduced to 0.2 bar or less.

3) Heat with recirculating CO$_2$: The CO$_2$ reactor is re-pressurized and hot CO$_2$ recirculated to the bed at point 7 to increase the temperature to effect desorption of water and CO$_2$ from the zeolite bed. Additional heaters may be utilized outside or embedded within the CO$_2$ reactor to optionally assist with reactor heating. The desorbed gas exits the CO$_2$ reactor at point 2 and flows through a condenser at point 4 where any water is separated. A heat recovery unit may be optionally integrated at point 3 to minimize energy loss. This process continues until the CO$_2$ reactor reaches the desired desorption temperature and a suitable amount of the water has been removed by condensation.

In some embodiments of the present invention, a high purity CO$_2$ product is desired and at least about 99% of the water will be removed by condensation. In some embodiments of the present invention, at least about 95% of the water will be removed by condensation. In some embodiments of the present invention, at least about 90% of the water will be removed by condensation. The range of desorption temperatures is somewhat dependent on the particular zeolite used and is usually somewhat different for water and CO$_2$. There is also a trade-off between speed (higher temperature) and cost (lower temperature). In some example embodiments of the invention, the bed is heated to a temperature of approximately 150-350° C. In some example embodiments of the invention, the bed is heated to a temperature of approximately 250-325° C. In some embodiments of the invention, the bed is heated to a temperature of about 300° C.

4) Vacuum II: Vacuum is applied to the CO$_2$ reactor again to remove the remaining CO$_2$ in the bed. Additional heaters may be utilized outside or embedded within the CO$_2$ reactor to optionally assist with maintaining a desired reactor temperature during desorption. Next, the process is repeated by flowing ambient air through the CO$_2$ reactor, which cools down the bed while starting the adsorption process (step 1 above). Once the bed is below about 80° C. (the specific value can vary based on the specific sorbent used), CO$_2$ starts adsorbing on the zeolite bed and the next adsorption has effectively begun. The ambient air flow will continue to cool the sorbent until adsorption restarts, and the process can continue until reaching an equilibrium point between the cooling effect of the flowing air and the adsorption heat given off.

FIG. 4 depicts the simulated adsorbed CO$_2$ concentration in the bed during each step of the proposed TVSA process. The intent of this figure is to explain the overall process and does not provide any information on the kinetics of adsorption/desorption. At time zero, the bed has already reached very close to its maximum capacity during the adsorption. Next, the first vacuum step (Vacuum I) is implemented, and nitrogen and other gases removed from the bed and the reactor. A very small amount of CO$_2$ is also desorbed during this step. Then, the bed is heated by recirculating CO$_2$. As the partial pressure of CO$_2$ in the bed is relatively low, the bed starts to adsorb more CO$_2$ until the temperature reaches a point where the desorption process begins. At the end of the heating process, the CO$_2$ concentration is still very high. Next, the second vacuum (Vacuum II) is applied to remove all the CO$_2$, which makes the bed fully regenerated and ready for the next cycle.

EXAMPLES

In the following examples, efforts have been made to ensure accuracy with respect to numbers used (e.g., amounts, temperature, etc.) but some experimental error and deviation should be accounted for. The examples are to be considered as not being limiting of the invention described herein.

General Procedures:

The CO$_2$-assisted TVSA process has been demonstrated at bench scale using a prototype system. A reactor chamber (2.89-inch internal diameter) was filled with 13X zeolite (166 g) in pellet form (1.6-2.5 mm) to give a sorbent bed 2.4 inches thick. Mass flow controllers were used to mix (i) dry air, moist air, and CO$_2$ to achieve the desired input gas for the adsorption step or (ii) dry nitrogen and CO$_2$ to achieve the desired input gas for the heating/regeneration step at the desired flow rates. Gas flow rates are reported in units of cubic feet per minute (cfm) and inlet humidity is reported as parts per million by volume (ppm). Humidity and CO$_2$ concentrations can be measured by sensors placed at the inlet and outlet of the reactor chamber. The reactor chamber and a gas loop may be heated independently with external heaters.

As a starting point, the adsorbent bed is prepared by performing a deep regeneration by heating the bed to 300° C. for several hours with a dry nitrogen purge. To simulate the adsorption process, the desired mixture of dry or humid (1,200 ppm) air with 420 ppm CO$_2$ is flowed through the adsorbent bed at a flow rate of 4.1 cfm until the outlet CO$_2$ concentration measures 315 ppm. The system is then evacuated under vacuum. The system is then filled with the desired heating gas (CO$_2$ or 50% CO$_2$ in nitrogen) which is circulated through the heated gas loop and the reaction chamber until the adsorbent bed has reached the desired temperature via convective heat transfer from the heating gas. The system is then evacuated under a given set of conditions to desorb the CO$_2$ and regenerate the adsorbent. The adsorption step is then repeated to determine the effectiveness (as measured by CO$_2$ capacity) of the desorption step.

Example 1

Effect of Desorption Time and Temperature on CO$_2$-Regeneration Performance

The general procedure described above was followed using dry air. For the baseline case, the adsorbent bed was regenerated by performing a deep regeneration (300° C.). For the comparative cases, CO$_2$ was circulated through the adsorbent bed at temperatures of 200° C., 250° C., and 300° C. After the bed reached the target temperature, vacuum (0.03-0.05 bar) was applied for either 20 or 240 minutes to remove the desorbed CO$_2$. The dry air adsorption step was then repeated to determine the CO$_2$ capacity after the desorption step. As shown in Table 1, there was a slight drop in performance when the CO$_2$ heating gas was present but overall desorption was still relatively high at higher regeneration temperatures or longer regeneration times. At only 200° C., the temperature likely dropped too quickly to below the effective $CO_2$ desorption temperature. Indeed, if the external heaters were utilized to maintain the bed temperature at 165° C., then some of the subsequent $CO_2$ capacity was restored for the 200° C. case (roughly 0.05 mmol/g).

TABLE 1

$CO_2$ Capacity After Different $CO_2$-Regeneration Temperatures/Times

| Regeneration Temperature (° C.) | 20-min Regeneration Time $CO_2$ Capacity (mmol/g) | 240-min Regeneration Time $CO_2$ Capacity (mmol/g) |
| --- | --- | --- |
| 200 | — | 0 |
| 250 | 0.28 | 0.35 |
| 300 | 0.36 | 0.39 |
| 300 (Deep Regeneration) | — | 0.41 |

Example 2

Effect of $CO_2$ Heating Gas Composition and Humidity on Adsorbent Regeneration

The general procedure described above was followed using dry air and humid air (1,200 ppm water). After adsorption and evacuation, the adsorbent bed was heated to 250° C. or 300° C. with the external heaters. For the baseline case, the heating was stopped, and vacuum (0.03-0.05 bar) was applied for 20 minutes to remove the desorbed $CO_2$. For the comparative cases, heating gas (either pure $CO_2$ or 50% $CO_2$ in nitrogen) at 250° C. or 300° C. was circulated through the adsorbent bed before the heating was stopped, and vacuum (0.03-0.05 bar) was applied for 20 minutes to remove the desorbed $CO_2$. The dry air adsorption step was then repeated to determine the $CO_2$ capacity after the desorption step and the data are summarized in Table 2. As seen in Example 1, there is a slight drop in performance as the amount of $CO_2$ content in the heating gas increases, but overall desorption was still relatively high. Moisture present in the adsorbent had a more significant effect on performance as might be expected for a sorbent (zeolite 13X) with a strong affinity for water, consistent with the better performance observed at higher temperature in Table 2.

TABLE 2

$CO_2$ Capacity After Different $CO_2$-Regeneration Conditions

| | $CO_2$ Capacity (mmol/g) | | |
| --- | --- | --- | --- |
| Heating Gas | Dry Air/ 250° C. | Humid Air/250° C. | Humid Air/300° C. |
| None (baseline case) | 0.34 | 0.15 | 0.27 |
| 50% $CO_2$ in Nitrogen | 0.29 | 0.14 | 0.17 |
| Pure $CO_2$ | 0.28 | 0.08 | 0.15 |

A noted limitation of the bench-scale testbed is that water was not condensed out of the circulating heating gas stream as indicated in the full process described in FIG. 3 (at point 4)— it was not removed until the vacuum stage, which exaggerates the magnitude of the detrimental effect of the moisture. However, under actual operating conditions, it would still likely be necessary to heat to a somewhat higher temperature and/or circulate for a longer period of time before applying Vacuum II if significant moisture was present in the adsorbent bed, so use of some type of desiccant system (e.g., as shown in FIG. 1 and FIG. 2) is important for reducing water content of the air stream when using sorbents such as zeolite 13X with high water affinities.

Example 3

Effect of $CO_2$ Heating Gas Composition on $CO_2$ Product Purity

The general procedure described above was followed using dry air. $CO_2$ or 50% $CO_2$ in nitrogen was circulated through the adsorbent bed at 250° C. After the bed reached the target temperature, vacuum (0.03 bar) was applied to remove the desorbed $CO_2$. The $CO_2$ content of the gas exiting the reactor chamber was measured using the sensor placed at the reactor outlet. As shown in FIG. 5, the product's average $CO_2$ purity over time is essentially constant at about 100% using pure $CO_2$ as the heating gas. However, when using a mixture of 50% $CO_2$ in nitrogen as the heating gas, the outlet product purity changes over time. At the beginning of the desorption, the purity was similar to the heating gas composition (about 50%). Over time, the product's $CO_2$ average purity increased to about 60%, consistent with the less strongly adsorbed nitrogen being depleted early in the desorption process and the more strongly adsorbed $CO_2$ coming off later. The average purity over time, P(t), is calculated based on the formula below:

$$P(t) = \int_{t_1}^{t} p(t) q(t) dt / \int_{t_1}^{t} q(t) dt$$

$t_1$ is the timestamp at the starting point of vacuum q(t) is the outlet product flow rate p(t) is $CO_2$ purity in the product One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including personal computing devices, mobile phones, servers, general purpose computers, special purpose computers, application-specific integrated circuit (ASIC), and digital/analog electronic circuits with discrete components, for example.

Although the description above contains many specifications, these should not be construed as limiting the scope of the invention but as merely providing illustrations of some of the presently preferred embodiments of this invention. As those skilled in the art will appreciate, numerous modifications and variations of the present invention are possible in light of these teachings, and all such are contemplated hereby. All of the references cited herein are incorporated by reference herein for all purposes, or at least for their teachings in the context presented. Therefore, the invention has been disclosed by way of example and not limitation, and reference should be made to the following claims to determine the scope of the present invention.

What is claimed is:

1. A method of performing direct air capture (DAC) of carbon dioxide ($CO_2$), the method comprising:
   drawing an air stream through a dehumidifier to remove a portion of humidity from the air stream which results in a relatively dry air stream;
   providing the relatively dry air stream through a reactor to remove the remaining humidity and the $CO_2$ from the relatively dry air stream which results in a dry purified air stream;
   applying a vacuum to the reactor to remove nitrogen from the reactor;
   circulating a gas composition comprising at least about 25% by volume of $CO_2$ through a loop comprising the reactor, a heater, a condenser, and a fan;
   heating the gas composition with the heater to a desorption temperature sufficient to desorb $CO_2$ and water from the reactor;
   condensing and collecting the desorbed water as the gas composition circulates through the condenser which results in a dry $CO_2$ product stream;
   applying a vacuum to the loop to remove the dry $CO_2$ product stream; and
   collecting the dry $CO_2$ product stream.

2. The method of claim 1, wherein the reactor is a zeolite reactor which comprises a packed, fluidized, or structured bed of solid $CO_2$ adsorbent.

3. The method of claim 2, wherein the solid $CO_2$ adsorbent is zeolite 13X.

4. The method of claim 2, wherein the gas composition has a water content of less than 1,000 ppm.

5. The method of claim 4, wherein the gas composition comprises at least 95% by volume of $CO_2$.

6. The method of claim 5, wherein at least 95% of the desorbed water is condensed and collected.

7. The method of claim 2, wherein the desorption temperature is between 150-350° C.

8. The method of claim 1, wherein the loop further comprises a heat recovery unit.

9. The method of claim 1, wherein the dehumidifier is a desiccant wheel.

10. The method of claim 9, wherein the desiccant wheel includes a continuously rotating wheel with lags between operations to perform a continuous dehydration process.

11. A system of performing direct air capture (DAC) of carbon dioxide ($CO_2$), the system comprising:
    a dehumidifier;
    a reactor;
    a heater;
    a condenser, and
    a fan,
    wherein the system is configured to:
       draw an air stream through the dehumidifier to remove a portion of humidity from the air stream which results in a relatively dry air stream,
       provide the relatively dry air stream through the reactor to remove the remaining humidity and the $CO_2$ from the relatively dry air stream which results in a dry purified air stream,
       apply a vacuum to the reactor to remove nitrogen from the reactor,
       circulate a gas composition comprising at least about 25% by volume of $CO_2$ through a loop comprising the reactor, the heater, the condenser, and the fan,
       heat the gas composition with the heater to a desorption temperature sufficient to desorb $CO_2$ and water from the reactor,
       condense and collect the desorbed water as the gas composition circulates through the condenser which results in a dry $CO_2$ product stream,
       apply a vacuum to the loop to remove the dry $CO_2$ product stream, and
       collect the dry $CO_2$ product stream.

12. The system of claim 11, wherein the reactor is a zeolite reactor which comprises a packed, fluidized, or structured bed of solid $CO_2$ adsorbent.

13. The system of claim 12, wherein the solid $CO_2$ adsorbent is zeolite 13X.

14. The system of claim 12, wherein the gas composition has a water content of less than 1,000 ppm.

15. The system of claim 14, wherein the gas composition comprises at least 95% by volume of $CO_2$.

16. The system of claim 15, wherein at least 95% of the desorbed water is condensed and collected.

17. The system of claim 12, wherein the desorption temperature is between 150-350° C.

18. The system of claim 11, wherein the loop further comprises a heat recovery unit.

19. The system of claim 11, wherein the dehumidifier is a desiccant wheel.

20. The system of claim 19, wherein the desiccant wheel includes a continuously rotating wheel with lags between operations to perform a continuous dehydration process.

* * * * *